(12) United States Patent
Wang

(10) Patent No.: US 9,875,479 B2
(45) Date of Patent: Jan. 23, 2018

(54) DEVICE MANAGEMENT APPARATUS, DEVICE MANAGEMENT SYSTEM, AND INFORMATION PROCESSING METHOD

(71) Applicant: Weibo Wang, Kanagawa (JP)

(72) Inventor: Weibo Wang, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 14/735,225

(22) Filed: Jun. 10, 2015

(65) Prior Publication Data

US 2016/0020960 A1 Jan. 21, 2016

(30) Foreign Application Priority Data

Jul. 16, 2014 (JP) .................................. 2014-145620

(51) Int. Cl.
| | | |
|---|---|---|
| *G06F 15/16* | (2006.01) | |
| *G06Q 30/00* | (2012.01) | |
| *H04L 12/24* | (2006.01) | |
| *H04M 15/00* | (2006.01) | |

(52) U.S. Cl.
CPC .............. *G06Q 30/01* (2013.01); *H04L 41/12* (2013.01); *H04L 41/5032* (2013.01); *H04M 15/8016* (2013.01)

(58) Field of Classification Search
CPC ............................ G03G 15/5079; H04L 41/12
See application file for complete search history.

(56) References Cited

U.S. PATENT DOCUMENTS

| | | | | |
|---|---|---|---|---|
| 8,699,893 B2* | 4/2014 | Yashiro | .................. | G03G 15/55 399/24 |
| 2003/0101257 A1* | 5/2003 | Godwin | .................. | G06Q 20/20 709/223 |
| 2006/0206373 A1* | 9/2006 | Blair | .................... | G03G 15/553 705/22 |
| 2008/0010109 A1* | 1/2008 | Ide | ..................... | G06Q 10/0631 705/7.12 |
| 2008/0285558 A1* | 11/2008 | Wu | .................... | G03G 15/5079 370/390 |
| 2010/0262467 A1* | 10/2010 | Barnhill, Jr. | ........ | H04L 12/2809 709/223 |
| 2011/0078231 A1* | 3/2011 | Oliver | .................. | G06F 9/5055 709/203 |
| 2012/0191827 A1* | 7/2012 | Wang | ................. | H04L 12/6418 709/221 |
| 2014/0085650 A1* | 3/2014 | Redfield | ................ | G06K 15/02 358/1.13 |

FOREIGN PATENT DOCUMENTS

| | | |
|---|---|---|
| JP | 2012-151738 | 8/2012 |
| JP | 2013-054624 | 3/2013 |

* cited by examiner

*Primary Examiner* — Hieu Hoang
(74) *Attorney, Agent, or Firm* — IPUSA, PLLC

(57) ABSTRACT

A device management apparatus including a receiving unit configured to receive state information indicating a change in a state of a device and store the state information in a state information storage unit; a sending unit configured to send report information relating to the state information to a predetermined destination, when the state information received by the receiving unit corresponds to a report target; and a changing unit configured to expand the report targets when an operation state of the device does not fulfill a scheduled state of a present time point, the operation state being identified based on history of the state information stored in the state information storage unit.

7 Claims, 12 Drawing Sheets

FIG.6

| CALL TYPE NAME | CALL NAME | CallType | CallDetail | GROUP NUMBER |
|---|---|---|---|---|
| ALARM CALL | PARTS ALARM | 1 | 1757 | 4 |
| | DETECTION OF NON-GENUINE TONER: BLACK | 1 | 2269 | 4 |
| | DETECTION OF NON-GENUINE TONER: YELLOW | 1 | 2270 | 4 |
| | DETECTION OF NON-GENUINE TONER: MAGENTA | 1 | 2271 | 4 |
| | DETECTION OF NON-GENUINE TONER: CYAN | 1 | 2272 | 4 |
| | JAM ALARM | 1 | 12781 | 4 |
| SERVICE CALL | SC CALL: CONTINUOUS JAM | 2 | 1757 | 2 |
| | SC CALL: LONG-TIME JAM | 2 | 2013 | 2 |
| | SC CALL: LONG-TIME DOOR OPEN | 2 | 2014 | 2 |
| | SC CALL: WASTE INK TANK FULL | 2 | 38888 | 2 |
| | SC CALL: FIXING OIL END | 2 | 23293 | 2 |
| | COUNTER CLEAR | 2 | 17885 | 2 |
| | SC RELEASE | 2 | 21981 | 2 |
| SUPPLY CALL | SADDLE STITCHING STAPLES | 4 | 13372 | 1 |
| | STAPLES | 4 | 13373 | 1 |
| | TONNER BOTTLE (Black) | 4 | 3374 | 1 |
| | TONNER BOTTLE (Yellow) | 4 | 3375 | 1 |
| | TONNER BOTTLE (Magenta) | 4 | 3376 | 1 |
| | TONNER BOTTLE (Cyan) | 4 | 3377 | 1 |
| | CARTRIDGE | 4 | 43558 | 1 |
| | MAINTENANCE KIT A | 4 | 43559 | 1 |

FIG.7

| DEVICE ID | CALL TYPE NAME | CALL ID | OCCURRENCE TIME AND DATE | RESOLUTION TIME AND DATE | RECOVERY TIME (MINUTES) | OCCURRENCE POINTS |
|---|---|---|---|---|---|---|
| AAA | SERVICE CALL | 23456 | 2013-02-28T00:00Z | 2013-02-28T00:05Z | 5 | 50 |
| BBB | SUPPLY CALL | 12345 | 2013-02-28T01:20Z | 2013-02-28T01:22Z | 2 | 10 |
| CCC | ALARM CALL | 78901 | 2013-02-28T01:32Z | 2013-02-28T01:44Z | 12 | 24 |
| ... | ... | ... | ... | ... | ... | ... |
| ... | ... | ... | | | | |

| CALL TYPE NAME | POINT COEFFICIENT |
|---|---|
| SERVICE CALL | 10 |
| SUPPLY CALL | 5 |
| ALARM CALL | 1 |

| EVALUATION ITEM | SERVICE CONDITION | SERVICE LEVEL | ADDITIONAL CONDITION |
|---|---|---|---|
| POSSIBILITY | 24 HOUR OPERATION | 95% | |
| RECOVERY TIME | WITHIN 10 MINUTES | 10000 POINTS /MONTH | WHEN THE RECOVERY TIME EXCEEDS 10 MINUTES, THE NUMBER OF POINTS IS TWO TIMES |
| NUMBER OF SERIOUS FAILURES | | TWO FAILURES /MONTH | |
| : | : | : | : |

| START TIME AND DATE | END TIME AND DATE | DEVICE ID | MAINTENANCE COST (YEN) | |
|---|---|---|---|---|
| ... | ... | ... | ... | ... |
| 2014/07/18 13:00 | 2014/07/18 14:00 | BBB | 2,000 | ... |
| ... | ... | ... | ... | ... |

| YEAR/MONTH/DATE | NUMBER OF SERVICE CALLS | NUMBER OF SUPPLY CALLS | NUMBER OF ALARM CALLS |
|---|---|---|---|
| ... | ... | ... | ... |
| 2012/7/17 | 3 | 4 | 5 |
| 2012/7/18 | 2 | 1 | 3 |
| 2012/7/19 | 3 | 3 | 4 |
| ... | ... | ... | ... |

| YEAR/MONTH | STANDARD CHARGE AMOUNT (YEN) |
|---|---:|
| JANUARY 2014 | 1,000,000 |
| FEBRUARY 2014 | 1,000,000 |
| MARCH 2014 | 1,200,000 |
| APRIL 2014 | 1,100,000 |

DEVICE MANAGEMENT APPARATUS, DEVICE MANAGEMENT SYSTEM, AND INFORMATION PROCESSING METHOD

BACKGROUND OF THE INVENTION

1. Field of the Invention

The present invention relates to a device management apparatus, a device management system, and an information processing method.

2. Description of the Related Art

There are cases where SLA (Service Level Agreement) for guaranteeing normal operations of a device, is made between a device vendor and a customer. The device vendor is a vendor of devices such as an image forming apparatus, typically a multifunction peripheral, a copier, a scanner, a printer, a fax machine, etc. For example, in SLA, the guaranteed contents relevant to the operation status of the device are defined, by using the operation rate as an index.

In order to confirm the fulfillment of SLA, usage of a system for remote monitoring the operation status of the device via a network (hereinafter, "device management system") may be considered. That is to say, in a device management system, the history of changes in the state of the device is managed. By using such a history, the operation status of the device in a predetermined period can be recognized, and a report indicating whether SLA is fulfilled can be obtained.

However, when the above report indicates non-fulfillment of SLA, at the time point of obtaining the report, the non-fulfillment of SLA may have already been determined.

Patent Document 1: Japanese Laid-Open Patent Publication No. 2012-151738

SUMMARY OF THE INVENTION

The present invention provides a device management apparatus, a device management system, and an information processing method, in which one or more of the above-described disadvantages are eliminated.

According to an aspect of the present invention, there is provided a device management apparatus including a receiving unit configured to receive state information indicating a change in a state of a device and store the state information in a state information storage unit; a sending unit configured to send report information relating to the state information to a predetermined destination, when the state information received by the receiving unit corresponds to a report target; and a changing unit configured to expand the report targets when an operation state of the device does not fulfill a scheduled state of a present time point, the operation state being identified based on history of the state information stored in the state information storage unit.

According to an aspect of the present invention, there is provided a device management system including at least one information processing apparatuses for implementing various functions of the device management system, the device management system including a receiving unit configured to receive state information indicating a change in a state of a device and store the state information in a state information storage unit; a sending unit configured to send report information relating to the state information to a predetermined destination, when the state information received by the receiving unit corresponds to a report target; and a changing unit configured to expand the report targets when an operation state of the device does not fulfill a scheduled state of a present time point, the operation state being identified based on history of the state information stored in the state information storage unit.

According to an aspect of the present invention, there is provided an information processing method executed by a computer, the information processing method including receiving state information indicating a change in a state of a device and storing the state information in a state information storage unit; sending report information relating to the state information to a predetermined destination, when the state information received at the receiving corresponds to a report target; and expanding the report targets when an operation state of the device does not fulfill a scheduled state of a present time point, the operation state being identified based on history of the state information stored in the state information storage unit.

BRIEF DESCRIPTION OF THE DRAWINGS

Other objects, features and advantages of the present invention will become more apparent from the following detailed description when read in conjunction with the accompanying drawings, in which:

FIG. 6 illustrates a configuration example of a call specification storage unit;

FIG. 7 illustrates a configuration example of a call history storage unit;

FIG. 8 illustrates a configuration example of a point coefficient storage unit;

FIG. 9 illustrates a configuration example of a contract information storage unit;

FIG. 12 illustrates a configuration example of a maintenance cost storage unit;

FIG. 13 illustrates an example of adding up the history calls for calculating the predicted call number;

DETAILED DESCRIPTION OF THE PREFERRED EMBODIMENTS

Figure 1:
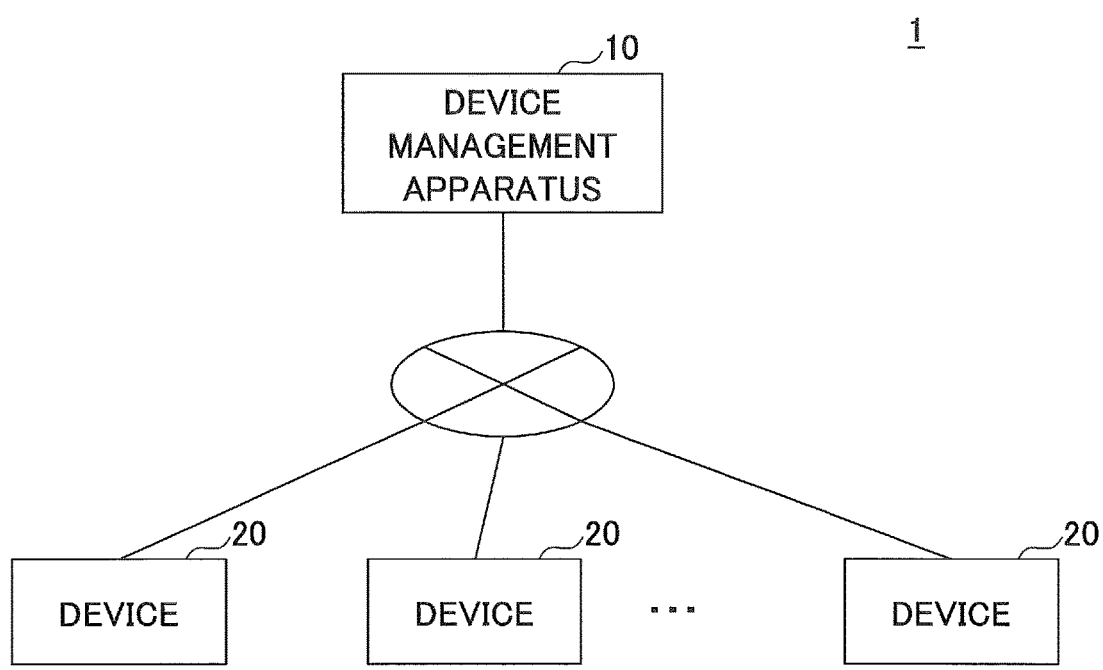
FIG. 1 illustrates a configuration example of a device management system according to an embodiment of the present invention.

A description is given, with reference to the accompanying drawings, of embodiments of the present invention. FIG. 1 illustrates a configuration example of a device management system according to an embodiment of the present invention. In FIG. 1, a device management system 1 includes a device management apparatus 10 and one or more devices 20. Each of the devices 20 and the device management apparatus 10 are connected such that communication is possible, via a network such as LAN (Local Area Network), the Internet, etc.

The device 20 is, for example, an image forming apparatus such as a multifunction peripheral, a printer, etc. The device 20 may be a projector (image projection device), an electronic blackboard, a digital camera, a TV conference system, etc.

The device management apparatus 10 is a computer for receiving information indicating a change in the state from each device 20, and supporting the fulfillment of SLA (Service Level Agreement), according to a business operator providing a maintenance service of the device 20 (hereinafter, "maintenance service provider"), based on the received information. SLA is a contract relevant to the quality, etc., of the maintenance service, which is made between the user of the device 20 and the maintenance service provider. Therefore, for the maintenance service provider, the user of the device 20 is the customer. Note that the device management apparatus 10 may be installed in a system environment on the side of the user of the device 20 (the side of the customer), or may be installed in a system environment on the side of the maintenance service provider. Furthermore, in the present embodiment, as a matter of convenience, a description is given of a single customer; however, when handling a plurality of customers, the process described below may be executed for each of the customers.

Figure 2:
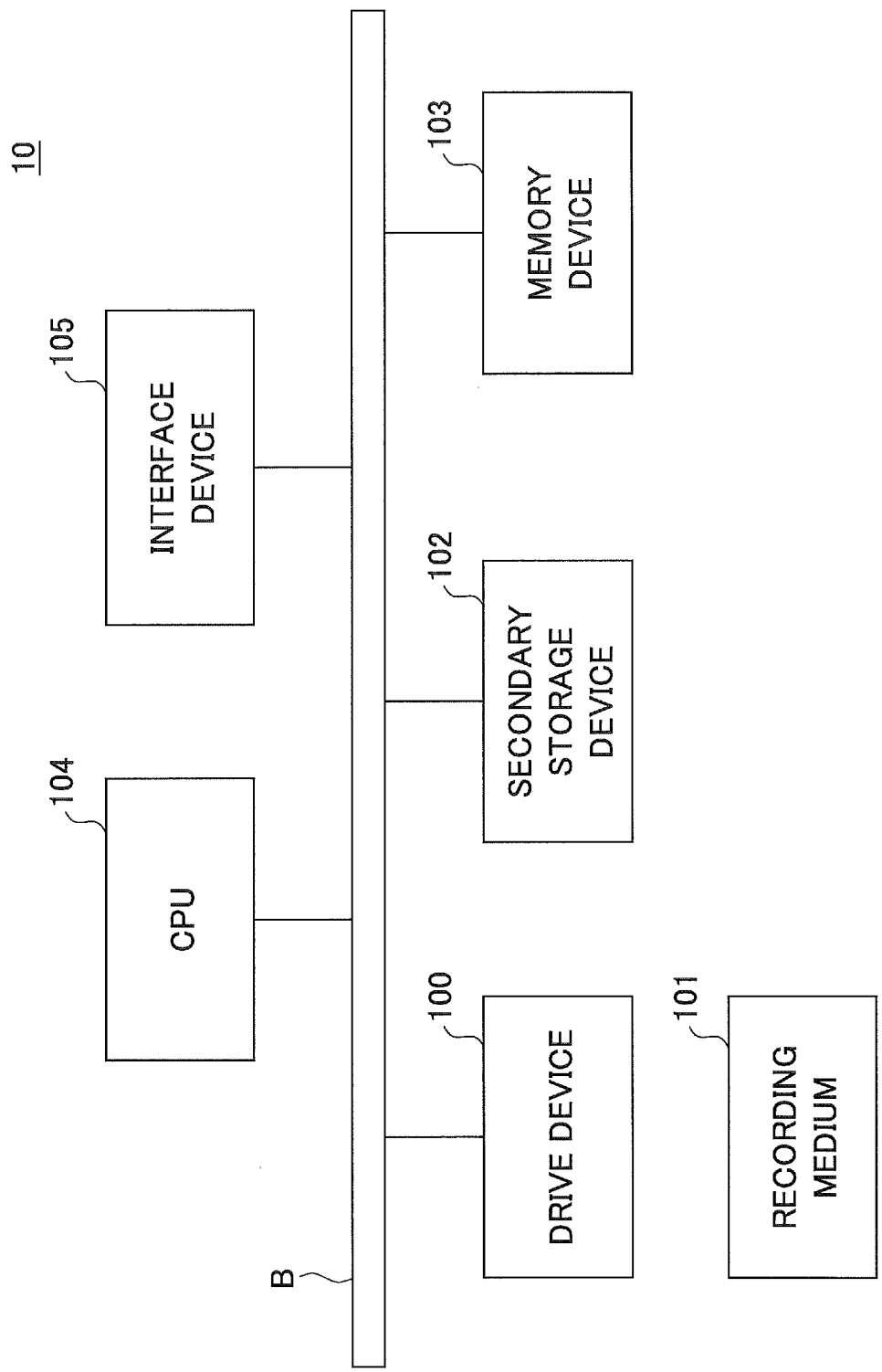
FIG. 2 illustrates a hardware configuration example of a device management apparatus according to an embodiment of the present invention.

FIG. 2 illustrates a hardware configuration example of the device management apparatus according to an embodiment of the present invention. The device management apparatus 10 of FIG. 2 includes a drive device 100, a secondary storage device 102, a memory device 103, a CPU 104, and an interface device 105, which are interconnected by a bus B.

Programs for realizing processes at the device management apparatus 10 are provided by a recording medium 101 such as a CD-ROM. When the recording medium 101 storing a program is set in the drive device 100, the program is installed in the secondary storage device 102 from the recording medium 101 via the drive device 100. However, the program need not be installed from the recording medium 101; the program may be downloaded from another computer via the network. The secondary storage device 102 stores the installed programs, together with necessary files, data, etc.

The memory device 103 reads a program from the secondary storage device 102 and stores the program, when an instruction to activate the program is given. The CPU 104 executes a function relevant to the device management apparatus 10, according to a program stored in the memory device 103. The interface device 105 is used as an interface for connecting the device management apparatus 10 to the network.

Note that the device management apparatus 10 may be a computer system including a plurality of computers having the hardware as illustrated in FIG. 2.

Figure 3:
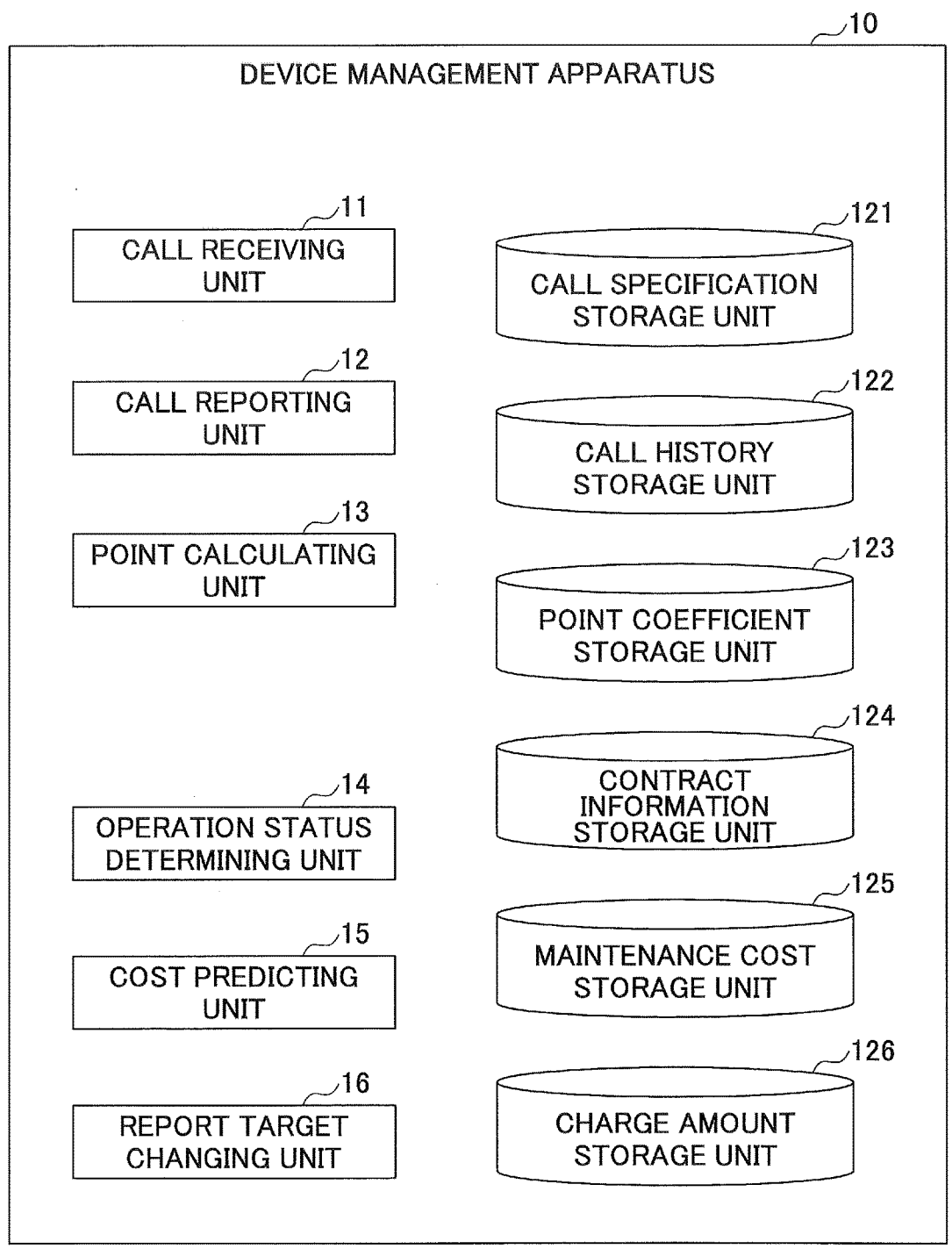
FIG. 3 illustrates a functional configuration example of the device management apparatus according to an embodiment of the present invention.

FIG. 3 illustrates a functional configuration example of the device management apparatus 10 according to an embodiment of the present invention. In FIG. 3, the device management apparatus 10 includes a call receiving unit 11, a call reporting unit 12, a point calculating unit 13, an operation status determining unit 14, a cost predicting unit 15, and a report target changing unit 16. These units are realized by processes that the CPU 104 is caused to execute, by one or more programs installed in the device management apparatus 10. Furthermore, the device management apparatus 10 uses a call specification storage unit 121, a call history storage unit 122, a point coefficient storage unit 123, a contract information storage unit 124, a maintenance cost storage unit 125, and a charge amount storage unit 126. These storage units can be realized by using the secondary storage device 102, or a storage device connected to the device management apparatus 10 via the network.

The call receiving unit 11 receives a call from each of the devices 20. A call is an example of information indicating the change in the state of the device 20. Examples of a change in the state of the device 20 are the occurrence of an abnormality and the resolution of an abnormality in the device 20, etc. Here, an abnormality is not limited to being caused by a failure, etc., in the device 20. For example, an abnormality may include the consumption or the depletion of a consumption article such as toner. The call receiving unit 11 stores information relevant to a received call, in the call history storage unit 122. Therefore, the call history storage unit 122 stores the history of calls.

The call reporting unit 12 executes a process for reporting to a serviceman that a call corresponding to the report target has occurred, among the calls received by the call receiving unit 11. That is to say, the call reporting unit 12 does not necessarily report all of the calls to the serviceman. For example, the reporting of the call may be performed by sending information indicating the occurrence of a call to a predetermined destination (address). A predetermined destination is, for example, the mail address of the serviceman. The serviceman is an individual who is in charge of maintenance operations of each device 20 according to the present embodiment, at the maintenance service provider.

It is determined whether the received call corresponds to a report target, by applying the information included in the received call, to the information stored in the call specification storage unit 121. The call specification storage unit 121 stores information indicating the specification relevant to the call. Information indicating the specification relevant to the call includes information indicating the classification of the call, attribute information of each classification, etc.

The point calculating unit 13 quantifies the level of disadvantage incurred on the customer due to the abnormality detected by the call. In the present embodiment, the value obtained by quantifying the level of disadvantage is referred to as "points". For example, points are calculated by using a coefficient stored in the point coefficient storage unit 123 and information stored in the contract information storage unit 124, etc., based on the type of abnormality, the elapsed time from when the abnormality occurs to when the abnormality is resolved, etc.

The point coefficient storage unit 123 stores the points per unit time, for each type of call. The contract information storage unit 124 stores information relevant to items necessary for processes executed by the device management apparatus 10, among the items defined in SLA. The maintenance cost storage unit 125 stores the cost (hereinafter, "maintenance cost") arising from the maintenance operation (recovery operation).

Note that the call receiving unit 11, the call reporting unit 12, and the point calculating unit 13 execute processes in a synchronous manner with the receiving of a call by the call receiving unit 11. Meanwhile, the operation status determining unit 14, the cost predicting unit 15, and the report target changing unit 16 execute processes in an asynchronous manner with the receiving of a call.

The operation status determining unit 14 determines whether the operation status of the device 20 satisfies (fulfills) a scheduled status (allowed status) for fulfilling SLA, based on the history of calls stored in the call history storage unit 122. That is to say, the history of calls is information indicating the history of the occurrence of an abnormality and the resolution of an abnormality in the device 20. According to this information, it is possible to recognize the operation status of the device 20.

The cost predicting unit 15 predicts the cost that may arise by expanding the range of calls to be the report targets, when it is determined that the operation status of the device 20 does not satisfy (fulfill) a scheduled status for fulfilling SLA. Here, the cost means the cost that arises when a call is reported to a serviceman. That is to say, when a call indicating the occurrence of an abnormality is reported to the serviceman, the serviceman goes to the customer, and performs operations (maintenance operations) for resolving the abnormality. The cost is the labor cost, etc., that arises according to the maintenance operation.

The report target changing unit 16 expands the range of calls to be the report targets, when the cost predicted by the cost predicting unit 15 satisfies a predetermined condition. Expanding the range of calls to be the report targets, leads to the improvement in the quality of the maintenance service. That is to say, by expanding the range of calls to be the report targets, information relevant to calls indicating a minor abnormality and a sign of an abnormality, is also reported to the serviceman. Thus, before a serious abnormality occurs, the serviceman is able to go to the customer and perform maintenance operations on the device 20. As a result, the possibility of fulfilling SLA is increased. Note that a predetermined condition is that, for example, the cost predicted by the cost predicting unit 15 is within an amount obtained by subtracting the profit from the amount of money charged (charge amount) with respect to the maintenance service. The charge amount with respect to the maintenance service is, for example, the charge amount that is defined for a predetermined period with the customer in SLA, etc. The charge amount is stored in the charge amount storage unit 126. The instances of expanding the range of calls to be report targets are limited to instances where the predetermined condition is satisfied, and therefore it is possible to prevent the quality of the maintenance service from becoming excessively high. That is to say, the extent of increasing the quality of the maintenance service can be suppressed to a level at which a loss is not incurred on the maintenance service provider.

Figure 4:
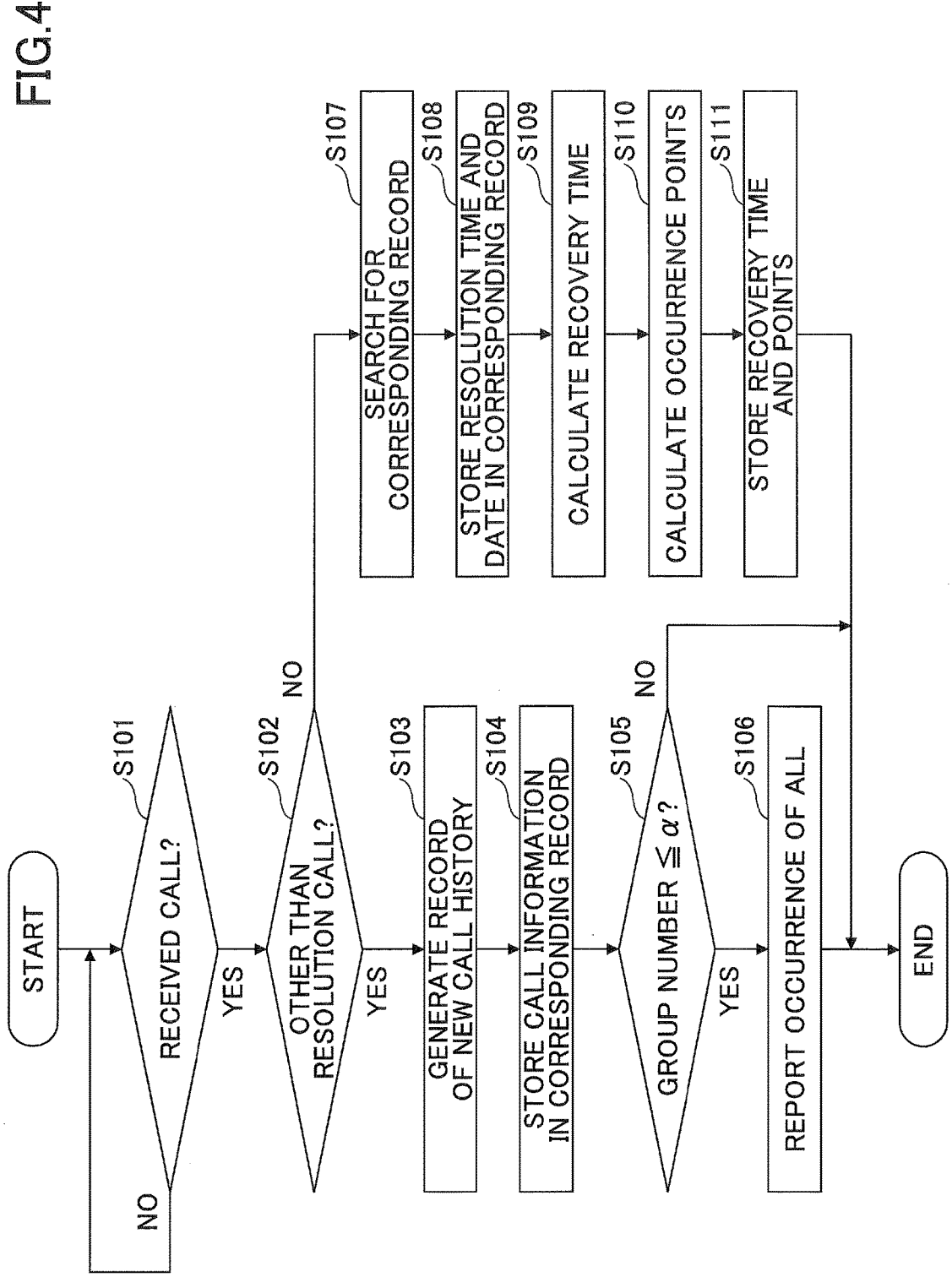
FIG. 4 is a flowchart of an example of processing procedures executed by the device management apparatus when a call is received.

In the following, a description is given of processing procedures executed by the device management apparatus 10. FIG. 4 is a flowchart of an example of processing procedures executed by the device management apparatus 10 when a call is received.

The call receiving unit 11 waits to receive a call sent from the device 20 (step S101). Alternatively, the call receiving unit 11 may query the device 20 as to whether there is a call. When a call is received (YES in step S101), the call receiving unit 11 determines whether the call indicates the occurrence of an abnormality or whether the call indicates the resolution of an abnormality (hereinafter "resolution call") (step S102).

Figure 5:
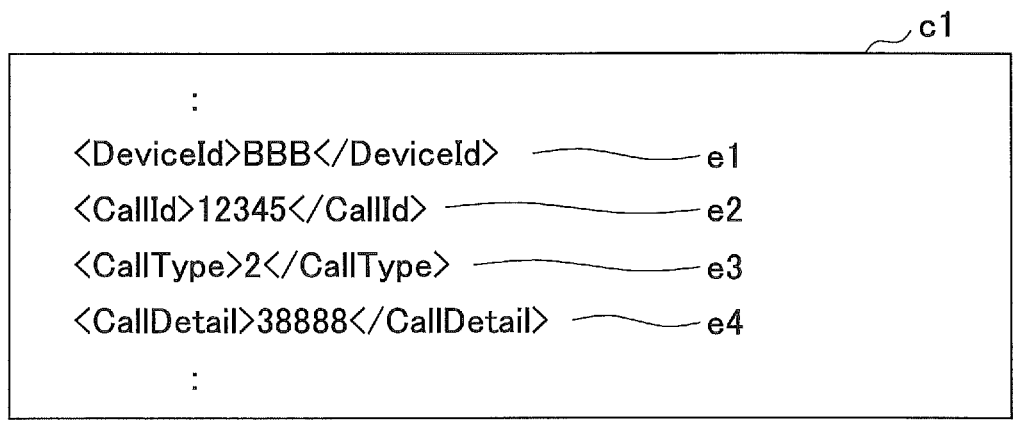
FIG. 5 illustrates an example of a call.

FIG. 5 illustrates an example of a call. FIG. 5 indicates an example in which a call c1 is data in an XML (eXtensible Markup Language) format. However, the data format of the call is not limited to a predetermined format.

The call c1 includes a DeviceId element e1, a CallId element e2, a CallType element e3, a CallDetail element e4, etc. The value of the DeviceId element e1 indicates the device ID of the device 20 that is the transmission source of the call c1. That is to say, the value of the DeviceId element e1 is the device ID of the device 20 at which a change in state has occurred as indicated by the call c1. The device ID is identification information of each machine corresponding to the device 20. The value of the CallId element e2 indicates identification information of each call (hereinafter, "call ID"). The value of the CallType element e3 indicates the call type. In the present embodiment, the call type is the topmost concept for classifying calls. The value of the CallDetail element e4 is information indicating the meaning of the call in detail.

It can be determined as to whether the call c1 is a call indicating the occurrence of an abnormality or a call indicating the resolution of an abnormality, by referring to the call specification storage unit 121.

FIG. 6 illustrates a configuration example of the call specification storage unit 121. In FIG. 6, the call specification storage unit 121 includes items of a call type name, a call name, CallType, CallDetail, a report group number, etc.

The call type name is the name of the call type. In the present embodiment, a call indicating the occurrence of an abnormality can be roughly classified into one of an alarm call, a service call, and a supply call. Note that the call type indicating the resolution of an abnormality (resolution call) is omitted from FIG. 6 as a matter of convenience. An alarm call is a call indicating an abnormality for which a quick maintenance operation by the serviceman is not necessarily needed, such as a minor abnormality or a sign of an abnormality. However, as a maintenance operation is performed in response to an alarm call, it is possible to increase the possibility of preventing beforehand the occurrence of a service call, a supply call, etc.

A service call is call that indicates the occurrence of an abnormality for which a quick maintenance operation by the serviceman is needed or preferably performed. A supply call is a call indicating that a consumption article (supply), such as toner, staples, cartridges, etc., has been consumed or depleted by more than a predetermined amount. When the supply has been consumed or depleted by more than a predetermined amount, the normal operation of the device 20 is likely to be interfered. Therefore, the supply call may also be considered as a call indicating a state where a quick maintenance operation by the serviceman is needed or preferably performed.

A call name is as described above. CallType is an item corresponding to the CallType element e3 included in the call c1. CallDetail is an item corresponding to the CallDetail element e4 included in the call c1. The group number is an item for distinguishing whether a group of calls is a report target or not, for each group including one or more call names (hereinafter, "call group"). Specifically, in the present embodiment, a call having a group number value that is less than or equal to a report target number α, is set as a report target. The report target number α is a variable threshold for distinguishing a call group that is the report target, and is set by the report target changing unit 16. A call group may be classified based on, for example, the frequency that a call occurs. For example, in FIG. 6, the value of the group number increases in the order of a supply call, a service call, and an alarm call. This indicates that the occurrence frequency of a supply call is lowest, and the occurrence frequency of an alarm call is highest. However, the call type and the occurrence frequency may not be necessarily associated with each other. For example, even when a call belongs to a group of supply calls, this call may have a higher occurrence frequency than a call belonging to a group of alarm calls. Furthermore, in FIG. 6, the call type and the group number are associated to each other in a one-on-one manner; however, a single call group may be formed by calls of different call types. Furthermore, when calls to be report targets are to be distinguished by call names, a different group number may be assigned to each call name.

According to the above, in step S102, when the value of the CallType element e3 of the received call is 1 indicating an alarm call, or 2 indicating a service call, or 4 indicating a supply call, it is determined that the call indicates the occurrence of an abnormality.

When the received call indicates the occurrence is an abnormality (YES in step S102), the call receiving unit 11 generates, in the call history storage unit 122, a new record for storing information relevant to the received call (step S103). Next, the call receiving unit 11 stores the information relevant to the received call in the newly generated record (step S104).

FIG. 7 illustrates a configuration example of the call history storage unit 122. In FIG. 7, the call history storage unit 122 stores, for each call indicating the occurrence of an abnormality in one of the devices 20, a device ID, a call type name, a call ID, an occurrence time and date, a resolution time and date, a recovery time, occurrence points, etc.

The device ID is the device ID of the device 20 at which the call has occurred. The call type name is a name of the call type of the call that has occurred. The call ID is the all ID of the call that has occurred. The occurrence time and date is the time and date at which the call has occurred. The resolution time and date is the time and date at which the call has been resolved. The recovery time is the elapsed time from the occurrence time and date to the resolution time and date. The occurrence points are the points that have occurred based on the calls.

In step S104, values are stored in the device ID, the call type name, the call ID, and the occurrence time and date of the record generated in step S103. That is to say, as the device ID, the value of the DeviceId element e1 of the received call is stored. As the call type name, a call type name of the record identified by applying the value of the CallType element e3 and the value of the CallDetail element e4 included in the received call, in the values of the CallType item and the CallDetail item in the call specification storage unit 121. As the call ID, the value of the CallId element e2 of the call is stored. As the occurrence time and date, the time and date when the call has been received is stored.

Next, the call reporting unit 12 determines whether the group number of the received call is less than or equal to the report target number α (step S105). The group number of the call is a group number of a record identified by applying the value of the CallType element e3 and the value of the CallDetail element e4 included in the received call, in the values of the CallType item and the CallDetail item in the call specification storage unit 121. For example, the group number of the call c1 indicated in FIG. 5 is 2. Furthermore, in the present embodiment, it is assumed that the initial value of the report target number α is 1. Therefore, as for the call c1, it is determined that the group number is not less than or equal to the report target number α.

When the group number is less than or equal to the report target number α (YES in step S105), the call reporting unit 12 sends the information relevant to the received call, to a predetermined destination (step S106). For example, the call may be directly transferred to the predetermined destination. As a result, the call is reported to the serviceman relevant to the destination. In response to the report of the call, the serviceman goes to the customer where the device 20 relevant to the device ID included in the call is installed, and performs a maintenance operation. Note that the predetermined destination may be stored in advance in the secondary storage device 102, etc., in association with the device ID, etc.

When the abnormality is resolved by the maintenance operation, the device 20 sends a resolution call indicating the resolution of the abnormality, to the device management apparatus 10. The resolution call may be automatically sent by the device 20, or may be sent by the device 20 according to an operation by the serviceman. The configuration of the resolution call may be the same as that illustrated in FIG. 5. For example, the CallId element e2 of the resolution call includes the call ID of the call relevant to the resolved abnormality. Furthermore, the CallType element e3 and the CallDetail element e4 include values indicating the call is a resolution call.

When the resolution call is received at step S101 (NO in step S102), the call receiving unit 11 searches the call history storage unit 122 for a record corresponding to the resolution call (hereinafter, "corresponding record") (Step S107). The corresponding record is a record including the device ID and the call ID matching the values of the device ID and the call ID included in the resolution call.

Next, the call receiving unit 11 stores the time and date at which the resolution call is received, as the resolution time and date in the corresponding record (step S108). Next, the point calculating unit 13 calculates the recovery time relevant to the record (step S109). That is to say, the point calculating unit 13 calculates the elapsed time (minutes) from the occurrence time and date to the resolution time and date of the record.

Next, the point calculating unit 13 refers to the point coefficient storage unit 123, the contract information storage unit 124, etc., and calculates the occurrence points relevant to the record (that is to say, points indicating the level of disadvantage incurred on the customer due to the abnormality relevant to the record) (step S110).

FIG. 8 illustrates a configuration example of the point coefficient storage unit 123. In FIG. 8, the point coefficient storage unit 123 stores a point coefficient in association with a call type name. The values of the point coefficients indicated in FIG. 8 are set such that the point coefficient increases as the importance or the seriousness of the call relevant to the corresponding call type name becomes greater.

The occurrence points are calculated by assigning the point coefficient in the following formula (1).

$$\text{Occurrence points} = \text{point coefficient} \times \text{recovery time} \qquad (1)$$

Note that, for example, the value of the point coefficient, the formula for calculating the points, etc., may be defined in SLA for each customer.

Furthermore, when an additional condition relevant to the calculation of the points is stored in the contract information storage unit 124, the additional condition may be applied in calculating the occurrence points.

FIG. 9 illustrates a configuration example of the contract information storage unit 124. In FIG. 9, each of the records in the contract information storage unit 124 includes items of an evaluation item, a service condition, a service level, an additional condition, etc.

The evaluation item is an item that is evaluated in relation to the fulfillment of SLA regarding the maintenance service. The service condition is a value that is a standard with respect to the service level described below. The service level indicates the level of a service condition that is requested by the customer or allowed by the costumer with respect to each evaluation item. The additional condition is a condition that is added to the service level of each evaluation item.

For example, the first record indicates that a possibility of 95% is requested, based on the standard of a daily 24 hour operation. The second record indicates the recovery time is requested to be basically within 10 minutes, and the occurrence points per month is less than or equal to 10000 points. The third record indicates that the number of occurrences of serious failures is requested to be within two times per month. That is to say, in the present embodiment, it is evaluated whether SLA is fulfilled every month.

The information stored in the contract information storage unit 124 is set based on the SLA with the customer. Therefore, the type of evaluation item, the service condition, and the value of the service level may differ for each customer. Note that the charge amount with respect to the maintenance service may be defined according to the contents of SLA. That is to say, as the requested condition becomes stricter, a higher charge amount may be set.

In FIG. 9, the item relevant to the calculation of the occurrence points of step S110, is the addition condition of the second record. That is to say, when the recovery time exceeds 10 minutes, the following formula (2) is applied instead of formula (1), to calculate the occurrence points.

$$\text{Occurrence points=point coefficient} \times \text{recovery time} \times 2 \qquad (2)$$

Note that only the points corresponding to the length of time exceeding 10 minutes may be multiplied by two. In this case, when the recovery time exceeds 10 minutes, the following formula (3) may be applied.

$$\text{Occurrence points=point coefficient} \times 10 + (\text{recovery time}-10) \times 2 \qquad (3)$$

It may be defined in SLA as to whether formula (2) or formula (3) is to be applied. Note that FIG. 7 illustrates an example where the occurrence points are calculated by applying formula (2).

Next, the point calculating unit 13 stores the recovery time calculated in step S109 and the occurrence points calculated in step S110, in the corresponding record of step S107 (step S111).

As described with reference to FIG. 4, when an abnormality occurs or an abnormality is resolved in one of the devices 20, a call indicating the occurrence of the abnormality or the resolution of the abnormality is received at the device management apparatus 10, and the call is stored in the call history storage unit 122. Therefore, the call history storage unit 122 stores information indicating the operation status of each device 20. For example, the occurrence points stored in the call history storage unit 122 are values that directly indicate the level of disadvantage incurred on the customer; however, the disadvantage occurs because the device 20 is not normally operating. Therefore, the occurrence points may also be interpreted as values indicating the operation status of the device 20.

Next, a description is given of a process executed by the device management apparatus 10 for detecting the possibility of non-fulfillment of SLA and reducing the possibility of non-fulfillment, before the non-fulfillment of SLA becomes determined at the end of the month. In the present embodiment, an attempt is made to reduce the possibility of non-fulfillment of SLA, by changing the report target number α (that is to say, changing the range of calls to be report targets), according to the occurrence status of points or the transition of occurrences of points.

Figure 10:
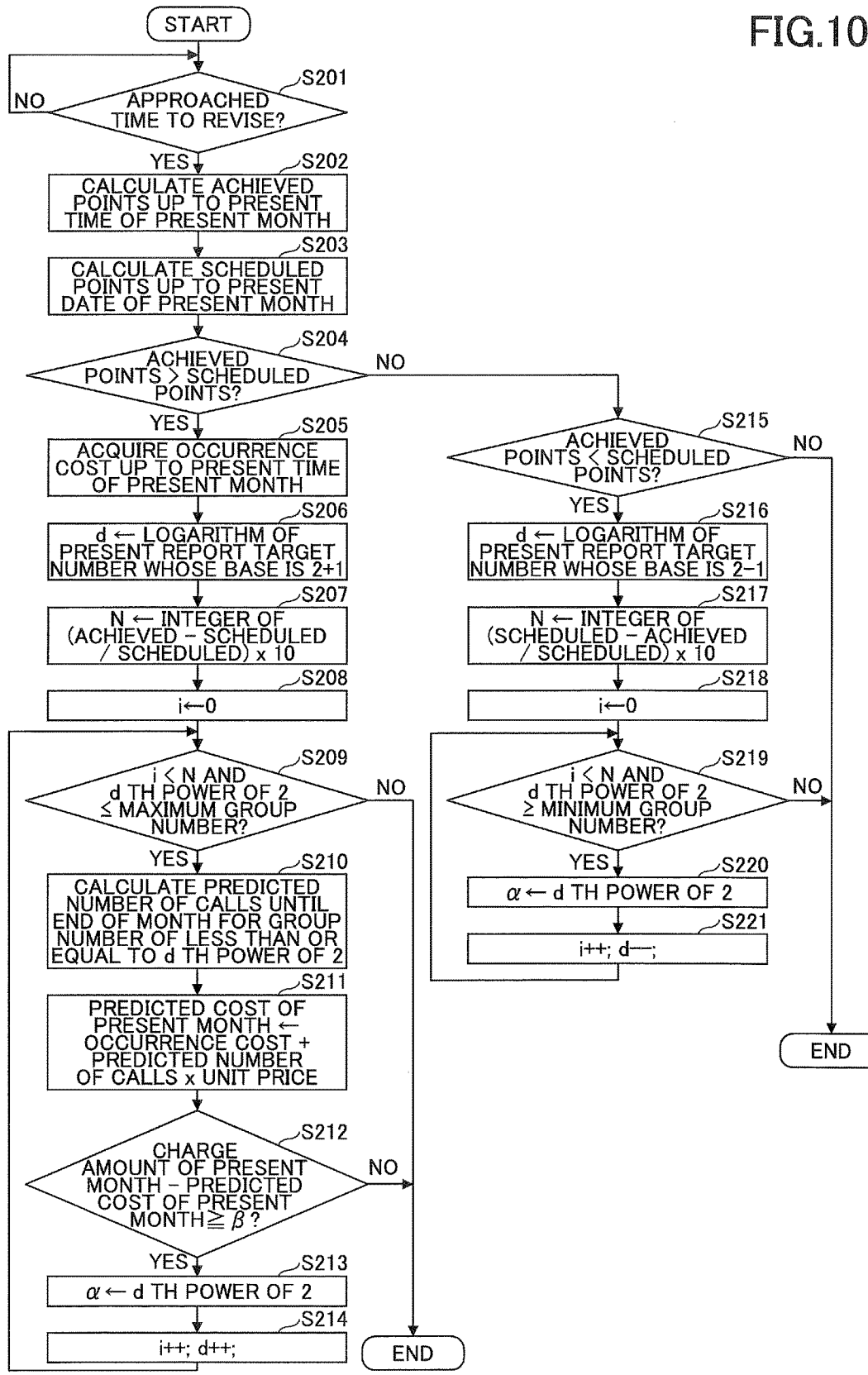
FIG. 10 is a flowchart of an example of processing procedures of a changing process of the range of calls to be report targets.

FIG. 10 is a flowchart of an example of processing procedures of a changing process of the range of calls to be report targets.

The operation status determining unit 14 waits for the approach of the time to revise the report target number α (step S201). For example, the time to revise the report target number α approaches periodically, such as once every other hour. When the time to revise the report target number α approaches (YES in step S201), the operation status determining unit 14 calculates the occurrence points up to the present time point of the present month (step S202). Specifically, the operation status determining unit 14 extracts, from the call history storage unit 122, a group of records whose resolution time and date belongs to the present month. The operation status determining unit 14 adds up the occurrence points of the respective records in the extracted group of records to calculate the occurrence points up to the present time point in the present month. In the following, the calculated points are referred to as the "achieved points". Note that the present month is month to which the present review time belongs.

Next, the operation status determining unit 14 calculates the scheduled points up to the present date of the present month (step S203). The scheduled points up to the present date are the points that are scheduled or allowed at the time point of the present date, for fulfilling SLA.

In the present embodiment, the scheduled points are calculated based on the history of calls of the same month in the past. Specifically, it is assumed that the present date is Jul. 18, 2014. In this case, for example, the scheduled points may be calculated based on the history of calls in in a month of July when SLA has been fulfilled, among the months of July in years before 2014. Here, it is assumed that a month in which the occurrence points per month is less than or equal to 10000 points, is a month in which SLA is fulfilled. For example, when SLA is fulfilled in July 2012, the operation status determining unit 14 extracts a group of records whose resolution time and date belongs to July 2012, from the call history storage unit 122. The operation status determining unit 14 adds up the occurrence points of the records in the extracted record group, for each day. As a result, the transition of scheduled points is obtained. Alternatively, the average value of occurrence points of each day in the month of July in several past years, may be calculated as the scheduled points. Furthermore, when the total scheduled points at the time point of the end of the month does not reach 10000 points, or when the total scheduled points at the time point of the end of the month exceeds 10000 points, the scheduled points of each day may be normalized such that the total scheduled points becomes 10000. Furthermore, the scheduled points may be calculated by another statistical method, etc.

Figure 11:
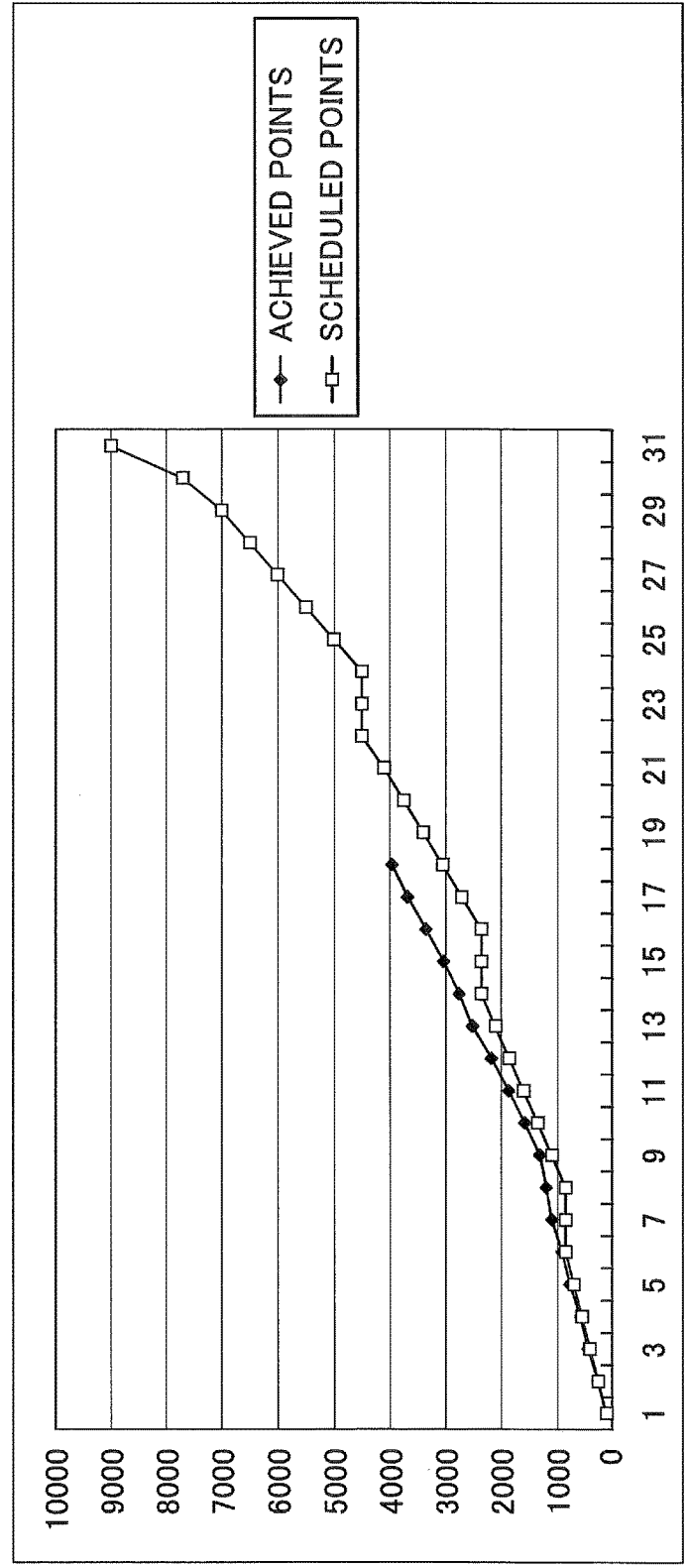
FIG. 11 illustrates an example of calculation results of achieved points and scheduled points.

By executing steps S202 and S203, the information as illustrated in FIG. 11 is obtained.

FIG. 11 illustrates an example of calculation results of achieved points and scheduled points. FIG. 11 illustrates an example of calculation results of achieved points and scheduled points, in the form of a table and in a form of a graph. Note that in the example of FIG. 11, the total scheduled points of one month is 9000 points. In this case, the scheduled points of each day may be normalized such that the total becomes 10000 points. Furthermore, in FIG. 11, the present date is the 18th. Therefore, the value up to the 18th is calculated with respect to the achieved points. Note that the scheduled points of each day may be calculated by dividing 10000 points by the number of days in the present month. However, the occurrence status of the actual points does not need to be uniform; the occurrence tends to transition according to the usage status of the device 20 by the customer. For example, when the usage frequency is high at the end of the month, the occurrence points tend to be high at the end of the month. Furthermore, the occurrence status of points may differ according to the month. For example, in a month at the end of term, the occurrence frequency in the device 20 may become high, and therefore the occurrence points may become high accordingly. Therefore, by calculating the scheduled points based on the history of calls in the same month in the past, it is possible to increase the possibility of obtaining the scheduled points in line with the usage status of the device 20 by the customer.

Next, the operation status determining unit 14 compares the achieved points up to the present time point of the present moth, with the scheduled points up to the present date of the present month (step S204). In the example of FIG. 11, the corresponding achieved points are 3960, and the corresponding scheduled points are 3050.

As illustrated in the example of FIG. 11, when the achieved points exceed the scheduled points (YES in step S204), the total occurrence points at the time point of the end of the month are highly likely to exceed 10000 points. Therefore, the processes of steps S205 and onward are executed.

In step S205, the cost predicting unit 15 calculates the maintenance cost that has already arisen up to the present time point in the present month, by referring to the maintenance cost storage unit 125.

FIG. 12 illustrates a configuration example of the maintenance cost storage unit 125. In FIG. 12, the maintenance cost storage unit 125 stores the start time and date, the end time and date, the device ID, the maintenance cost, etc., for each maintenance operation that has actually been performed. The start time and date is the start time and date of the maintenance operation. The end time and date is the end time and date of the maintenance operation. The device ID is the device ID of the device 20 that is the target of the maintenance operation. The maintenance cost is the cost (labor cost) that has arisen according to the maintenance operation.

In step S205, in the maintenance cost storage unit 125, the maintenance cost up to the present time point of the present month is calculated, by adding up the maintenance costs of the group of records whose end time and date belongs to the present month.

Next, the cost predicting unit 15 assigns, in a variable d, a value obtained by adding one to the logarithm of present report target number α whose base is two (step S206). That is to say, the calculation result of ($\log_2$ (report target number α)+1) is assigned in the variable d. In the present embodiment, the group number compared with the report target number α is the power of two. It is calculated as to what power of two to which the report target number α corresponds, by $\log_2$ (report target number α). By adding one to this calculation result, it is possible to obtain what power of two to which the minimum group number, which is larger than the present report target number α, corresponds. For example, when the present report target number α is one, one is assigned in the variable d.

Next, the cost predicting unit 15 assigns, in a variable N, the integer value (integer part) of the following calculation result (step S207).

((achieved points−scheduled points)/scheduled points)×10

That is to say, the ratio of the difference between the achieved points and the scheduled points to the scheduled points is multiplied by 10, and an integer value of the value obtained by the multiplication is assigned in the variable N. For example, when the ratio of the difference between the achieved points and the scheduled points to the scheduled points is 30%, the value of N becomes three. The variable N is a variable that determines the upper limit of the number of times of performing the loop of steps S209 and onward. The value of the variable N is obtained by such a calculation, such that as the difference between the achieved points and the scheduled points increases, the number of times of performing the loop of steps S209 and onward is increased. In this loop, the value of the report target number α is gradually increased. Therefore, the larger the value of N, i.e., the larger the difference between the achieved points and the scheduled points, the greater the increase width of the value of the report target number α.

Next, the cost predicting unit 15 assigns zero in the variable i (step S208). The variable i is a variable for counting the number of times of performing the loop of steps S209 and onward.

Next, the cost predicting unit 15 determines whether the value of the variable i is less than the value of the variable N, and whether $2^d$ (dth power of two) is less than or equal to the maximum value of group numbers (step S209). The condition that the value of the variable i is less than the value of the variable N, is for making the number of times of performing the loop less than or equal to N times. The condition that $2^d$ is to be less than or equal to the maximum value of group numbers, is for avoiding a situation of having to perform a wasteful process of attempting to increase the report target number α, even though the report target number α has already reached the maximum value.

When these conditions are satisfied (YES in step S209), the cost predicting unit 15 refers to the call history storage unit 122, and calculates the number of calls whose group number is less than or equal to $2^d$, that are predicted to occur until the end of the present month (hereinafter, "predicted call number") (step S210).

The predicted call number may be obtained by, for example, adding up the history calls used for calculating the scheduled points (the group of records in the call history storage unit 122) as illustrated in FIG. 13.

FIG. 13 illustrates an example of adding up the history calls for calculating the predicted call number. FIG. 13 indicates the results of adding up the number of service calls, the number of supply calls, and the number of alarm calls for each day, based on history of calls in July 2012. Note that similar to the scheduled points, the average value of numbers of calls of each day in the month of July in several past years, may be calculated, with respect to the number of service calls, the number of supply calls, and the number of alarm calls.

The cost predicting unit 15 adds up the numbers of calls of call types whose group number is less than or equal to $2^d$, with respect to the records from July 19 to July 31 of the addition results illustrated in FIG. 13. For example, when the value of the variable d is one, the number of service calls and the number of supply calls whose group numbers are less than or equal to two, are added up. In the addition result, the call type need not be distinguished. For example, the addition result of service calls and the addition result of supply calls may be combined. Therefore, a single value is derived as the addition result. The derived value corresponds to the predicted call number.

Next, the cost predicting unit 15 calculates the predicted value of the maintenance cost of the present month (hereinafter, "present month predicted cost"), by adding a value of "predicted call number×unit price" to the result value of the maintenance cost up to the present time point of the present month calculated in step S205 (step S212). The unit price is, for example, the minimum labor cost that arises by dispatching a serviceman once. The "predicted call number× unit price" is a predicted value of the cost that arises from the day after the present date to the end of the month, when the report target number α is changed to $2^d$.

Next, the cost predicting unit 15 determines whether a value obtained by subtracting the present month predicted cost from the charge amount of the present month defined in advance by SLA, etc., is greater than or equal to β (step S212). For example, β is a value of the profit that is to be secured. Furthermore, the charge amount of the present month is stored in the charge amount storage unit 126.

Figures 14, 15:
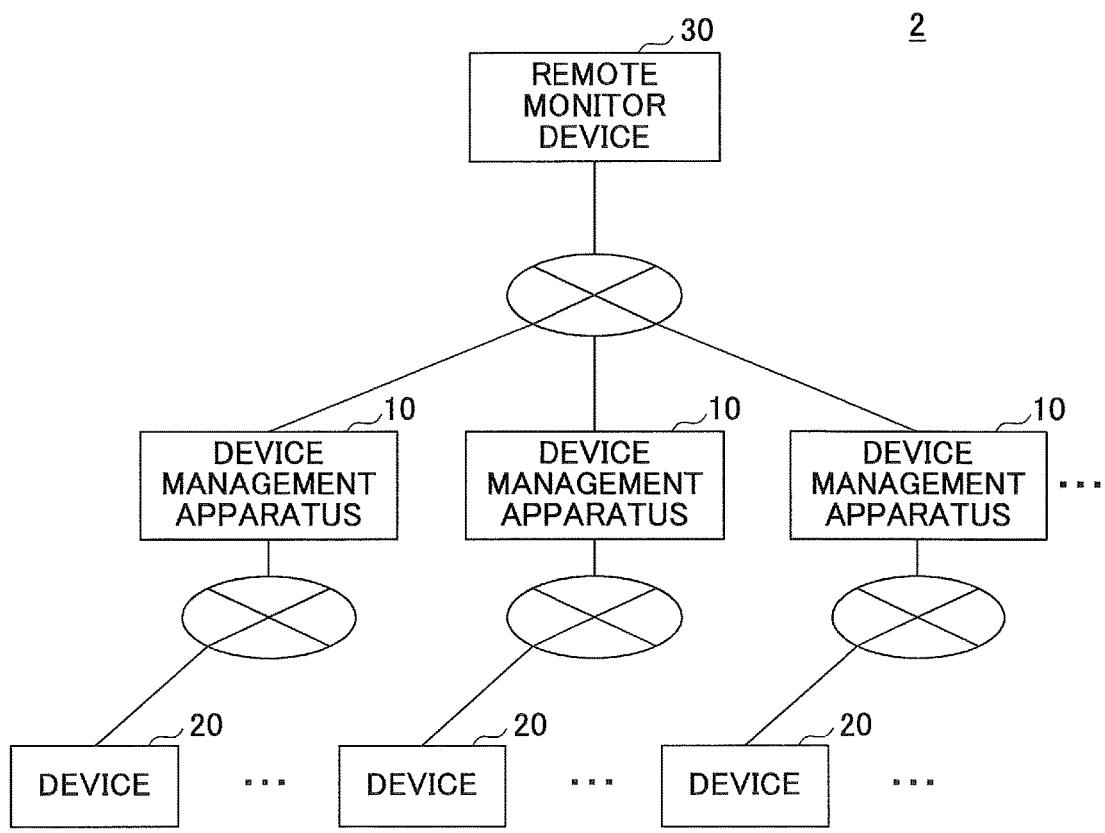
FIG. 14 illustrates a configuration example of a charge amount storage unit.
FIG. 15 illustrates another configuration example of a device management system according to an embodiment of the present invention.

FIG. 14 illustrates a configuration example of the charge amount storage unit 126. In FIG. 14, the charge amount storage unit 126 stores the standard charge amount for each month. The standard charge amount is the charge amount in the case where SLA is fulfilled. When the non-fulfillment of SLA has occurred, for example, an amount that is reduced from the standard charge amount according to the level of non-fulfillment, is charged. The standard charge amount and the reduction amount in the case of non-fulfillment of SLA may be defined in advance in SLA, etc. Note that the standard charge amount is set for each month because it is considered that the usage status of the device 20 may vary according to the month. For example, the usage frequency of the device 20 increases in March, and therefore the standard charge amount is set to a large amount.

When the value obtained by subtracting the present month predicted cost from the standard charge amount of the present month is greater than or equal to β (YES in step S212), the report target changing unit 16 assigns $2^d$ in the report target number α (step S213). As a result, the range of calls to be the report targets is expanded. This is because in step S105 of FIG. 4, the number of calls determined as having a group number that is less than or equal to the report target number α, is increased.

Next, the cost predicting unit 15 adds one to each of the variable i and the variable d (step S214), and repeats steps S209 and onward. That is to say, even when the range of calls to be the report targets is further expanded, if it is worth the cost, the report target number α is further increased.

Meanwhile, when the value obtained by subtracting the present month predicted cost from the standard charge amount of the present month is less than β (NO in step S212), the process of FIG. 10 is ended. This is because when the report target number α increases up to $2^d$, it is not worth the cost. Furthermore, when the variable i becomes greater than or equal to N, or when $2^d$ exceeds the maximum value of group numbers (NO in step S209), the process of FIG. 10 ends.

Meanwhile, in step S204, when the achieved points are less than or equal to the scheduled points (NO in step S204), the report target changing unit 16 determines whether the achieved points are less than the scheduled points (step S215). When the achieved points are equal to the scheduled points (NO in step S215), the process of FIG. 10 is ended. This is because in this case, the occurrence of points is as scheduled. However, this also means that the occurrence of points is at a borderline. Therefore, steps S205 and onward may be executed even when the achieved points are equal to the scheduled points.

When the achieved points are less than the scheduled points (YES in step S215), in steps S216 and onward, the report target changing unit 16 executes a process for reducing the report target number α. This is to reduce the number of times of dispatching a serviceman and reduce the maintenance cost, because there is a margin in the fulfillment of SLA.

In step S216, the report target changing unit 16 assigns, in a variable d, a value obtained by subtracting one from the logarithm of present report target number α whose base is two (step S216). That is to say, the calculation result of ($\log_2$ (report target number α)−1) is assigned in the variable d. For example, when the present report target number α is four, one is assigned in the variable d.

Next, the cost predicting unit 15 assigns, in the variable N, the integer value (integer part) of the following calculation result (step S217).

((scheduled points−achieved points)/scheduled points)×10

The above formula is different from that of step S207 in that the achieved points are subtracted from the scheduled points.

Next, the report target changing unit 16 assigns zero in the variable i (step S218). Next, the report target changing unit 16 determines whether the value of the variable i is less than the value of the variable N, and whether $2^d$ is greater than or equal to the minimum value of group numbers (step S219). When these conditions are satisfied (YES in step S219), the report target changing unit 16 assigns $2^d$ in the report target number α (step S220). As a result, the range of calls to be the report targets is reduced. This is because in step S105 of FIG. 4, the number of calls determined has having a group number that is less than or equal to the report target number α, is decreased.

Next, the cost predicting unit 15 adds one to the variable i and subtracts one from the variable d (step S221), and repeats steps S219 and onward. As a result, step S220 is executed for N times at maximum. That is to say, the less the achieved points are than the scheduled points, the smaller the report target number α. However, when the result of step S215 is YES, step S220 may be executed once without executing steps S217 through S219 and step S221. That is to say, in one review time, the maximum decrease width of the report target number α may be one stage. The same applies to the increase width of the report target number α. That is to say, steps S210 through S213 may be executed without executing steps S207 through S209 or step S214.

As described above, according to the present embodiment, when the operation status of the device 20 at a certain time point in a predetermined time period (for example, one month) does not satisfy (fulfill) a status that is scheduled based on SLA, etc., at the certain time point (for example, when the achieved points exceed the scheduled points), the range of the calls to be the report targets is expanded. As a result, it is possible to increase the possibility of preventing beforehand the occurrence of multiple subsequent calls. Therefore, it is possible to increase the possibility of maintaining the operation status of the device 20 at an appropriate status.

Furthermore, the range of calls to be report targets is expanded only when it is worth the cost. Therefore, it is possible suppress the occurrence of maintenance operations exceeding the compensation.

Furthermore, when the operation status of the device 20 at a certain time point satisfies (fulfills) the scheduled status at the certain time point (for example, the achieved points are less than the scheduled points), the range of calls to be the report targets is decreased. As a result, the maintenance cost can be decreased.

Note that the device management system may be configured as illustrated in FIG. 15. FIG. 15 illustrates another configuration example of a device management system according to an embodiment of the present invention. In FIG. 15, the same elements as those in FIG. 1 are denoted by the same reference numerals, and descriptions thereof are omitted.

In a device management system 2 illustrated in FIG. 15, a remote monitor device 30 is connected to one or more device management apparatuses 10 via a network. Each device management apparatus 10 is connected to one or more devices 20 via a network. The device management apparatuses 10 may be installed at the same customer, or may be installed at different customers.

The device management apparatuses 10 may transfer calls to the remote monitor device 30. In this case, the remote monitor device 30 may execute processes, which have been described above as being executed by the device management apparatus 10. That is to say, the remote monitor device 30 may have the functional configuration as illustrated in FIG. 3. Alternatively, the functional configuration illustrated in FIG. 3 may be distributed between the remote monitor device 30 and the device management apparatus 10. For example, the remote monitor device 30 may include, for each customer, the call specification storage unit 121, the call history storage unit 122, the point coefficient storage unit 123, the contract information storage unit 124, the maintenance cost storage unit 125, and the charge amount storage unit 126; and each device management apparatus 10 may include the call receiving unit 11, the call reporting unit 12, the point calculating unit 13, the operation status determining unit 14, the cost predicting unit 15, and the report target changing unit 16.

Note that in the present embodiment, the call receiving unit 11 is an example of a receiving unit. The call is an example of state information. The call reporting unit 12 is an example of a sending unit. Information indicating the occurrence of a call that is sent to a predetermined destination is an example of report information. The report target changing unit 16 is an example of a changing unit. The call history storage unit 122 is an example of a state information storage unit. The operation status determining unit 14 is an example of an identifying unit. The cost predicting unit 15 is an example of a predicting unit. The achieved point is an example of an operation state of the device identified based on the history of the state information. The scheduled point is an example of a scheduled state of the present time point. The device management apparatus 10, or the device management apparatus 10 and the remote monitor device 30, are examples of an information processing system and an information processing apparatus.

According to one embodiment of the present invention, a device management apparatus, a device management system, and an information processing method are provided, which are capable of increasing the possibility of maintaining the operation state of the device in an appropriate state.

The device management apparatus, the device management system, and the information processing method are not limited to the specific embodiments described herein, and variations and modifications may be made without departing from the spirit and scope of the present invention.

The present application is based on and claims the benefit of priority of Japanese Priority Patent Application No. 2014-145620, filed on Jul. 16, 2014, the entire contents of which are hereby incorporated herein by reference.

What is claimed is:

1. A device management apparatus comprising:
a hardware processor; and
one or more memories storing a program containing instructions which cause the hardware processor to:
receive a call from a device over a network, the call including state information indicating a change in a state of the device, and a device identifier that identifies the device, and store the state information and the device identifier in the one or more memories;
determine whether the state information received from the device over the network corresponds to one of multiple report targets by referencing a value of a group number;
send report information relating to the state information to a predetermined destination, when the received state information is determined to correspond to one of the multiple report targets; and
increase a number of report targets by modifying the value of the group number when, at a present time point, an operation state of the device does not meet a scheduled operation state, the operation state of the device being identified based on history of the state information stored in the one or more memories.

2. The device management apparatus according to claim 1, wherein the instructions cause the hardware processor to:
identify the scheduled state of the operation state of the device up to the present time point in a predetermined period, based on the history of the state information stored in the one or more memories, and
increase the number of report targets when the operation state of the device does not meet the identified scheduled operation state, the operation state being identified based on the history of the state information up to the present time point in the predetermined period, among the history of the state information stored in the one or more memories.

3. The device management apparatus according to claim 2, wherein the instructions cause the hardware processor to:
predict a number of items of the state information corresponding to the report targets after the number of report targets have been increased, among the state information received within the predetermined period, the number of items of the state information being predicted based on the history of the state information stored in the one or more memories, and
increase the report targets according to the number of predicted items of the state information.

4. The device management apparatus according to claim 3, wherein the instructions cause the hardware processor to:
predict a cost within the predetermined period, based on the predicted number of items of the state information and a cost that arises by sending the report information, and
increase the number of report targets when the cost within the predetermined period is less than or equal to a predetermined value.

5. The device management apparatus according to claim 1, wherein the instructions cause the hardware processor to:
reduce the number of report targets when the operation state of the device meets the scheduled state of the present time point, the operation state being identified based on the history of the state information stored in the one or more memories.

6. A device management system including for implementing various functions of the device management system, the device management system comprising:

a device including at least one of an image forming apparatus, a multifunction peripheral, a copier, a scanner, a printer, a fax machine, or a projector; and an information processing apparatus including a hardware processor and one or more memories storing a program containing instructions which cause the hardware processor to:

receive a call from the device over a network, the call including state information indicating a change in a state of the device, and a device identifier that identifies the device, and store the state information in the one or more memories;

determine whether the state information received from the device over the network corresponds to one of multiple report targets by referencing a value of a group number;

send report information relating to the state information to a predetermined destination, when the received state information is determined to correspond to one of the multiple report targets; and increase a number of report targets by modifying the value of the group number when, at a present time point, an operation state of the device does not meet a scheduled operation state, the operation state of the device being identified based on history of the state information stored in the one or more memories.

7. An information processing method executed by a computer, the information processing method comprising:

receiving a call from a device over a network, the call including state information indicating a change in a state of the device, and a device identifier that identifies the device, and storing the state information and the device identifier in a memory;

determining whether the state information received from the device over the network corresponds to one of multiple report targets by referencing a value of a group number;

sending report information relating to the state information to a predetermined destination, when the state information received at the receiving is determined to correspond to one of the multiple report targets; and increasing a number of report targets by modifying the value of the group number when, at a present time point, an operation state of the device does not meet a scheduled operation state, the operation state of the device being identified based on history of the state information stored in the memory.

\* \* \* \* \*